A. STICKNEY.
Hand Seeder.
No. 14,003. Patented Dec. 25, 1855.
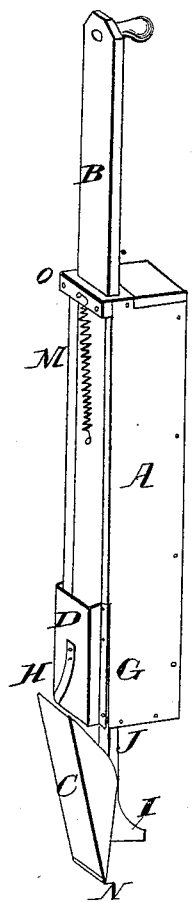
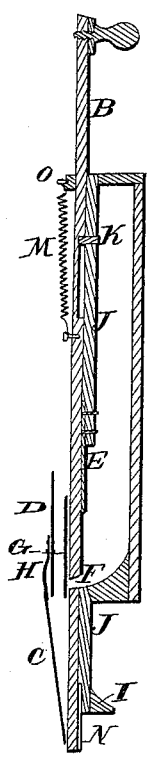

UNITED STATES PATENT OFFICE.

A. STICKNEY, OF CONCORD, NEW HAMPSHIRE.

IMPROVEMENT IN HAND SEED-PLANTERS.

Specification forming part of Letters Patent No. 14,003, dated December 25, 1855.

*To all whom it may concern:*

Be it known that I, ANCIL STICKNEY, of Concord, in the county of Merrimac and State of New Hampshire, have invented a new Improvement in Seed-Planters; and I do hereby declare that the following is a full and exact description, reference being had to the accompanying drawings, which form a part of this specification.

Figure 1 represents the entire planter; Fig. 2, a longitudinal section.

A is the seed-box. The side J of this extends below the box, and has its lower end enlarged to form a sufficient surface, I, to rest upon the ground. This side piece has a long slot cut in it, as seen in Fig. 2, extending from E to F, forming an opening to the interior of the seed-box, the bottom of said slot coinciding with the bottom of the seed-box.

N is a piece of sheet metal of the same width as J and fastened to J, so that their faces form a smooth surface, and extend below the surface of the ground I as far as the seed is to be planted.

E is a spring, conveniently made of tin, of such width as to play inside of the slot in J, and is fastened to J above the slot, and extends down in front of the slot so far as to get sufficient length for the spring required.

B is the plunger, movable upon the side J. It has a handle upon it, and when down it reaches to the bottom of N. It has in it an orifice, F, in front of the slot in J, which, combined with the plate G, forms the cup for the distribution of seed.

G is a thin plate, fastened to the sides of the box, and prevents the seed dropping from F before it rises to the proper height. This plate must extend higher than the lower end of E.

D is a sheath, which conducts the seed into C.

C is a jaw, conveniently made of sheet-iron, and shaped as represented by the drawings. This jaw is attached to J by a hinge on each side.

H is a spring fastened to D, the lower end of it pressing against the inside of the upper end of C, and thus keeping the lower end of C closed against N.

O is a cross-piece fastened to the sides of A to keep B in place.

K is a pin projecting from J and entering a slot in B, to prevent B from sliding too far either way.

A tension-spring, M, is connected to the plunger B and to the cross-bar O of the seed-box, which must be sufficiently stiff to prevent the plunger from sliding downward upon the seed-box in operating the machine until after the lower extremity of the wedge-shaped planting-receptacle has entered the ground to the proper depth for depositing the seed contained in it. As soon as the said planting-receptacle has descended to the proper depth in the ground the guard I will arrest its further downward movement, and by so doing will cause sufficient force to be exerted upon the plunger to force it downward into the planting-receptacle and discharge the seed therefrom by opening its hinged jaw C.

The planter is intended to be of convenient length to be operated by the hand. The proportions of the different parts may be as represented by the drawings, or be varied to suit taste or convenience.

Operation: The box A being filled with seed, the handle of B is taken by the hand. As the planter is lifted B slides up till the cup F, filled with seed, comes above the upper edge of the plate G, when the seed falls out of the cup and is conducted by D down into C, where it falls into the angular space formed by C and N and under the lower end of B. The planter is now struck into the ground. The wedge formed by C and N enters the ground as far as I, when B descends and crowds the lower end of the jaw C open and expels the seed, carrying it out under its lower end. The spring E prevents the seed in the box from running out through F when F is above the plate G, and also when a seed catches between the lower edge of F and the lower end of E. Then E springs out and the seed is thrown either into the cup or back into the box, and is not crushed or broken. By this operation the seed is deposited in the ground lower than any part of the planter reaches, and the planting of a hill can be done instantaneously and with certainty, for the seed is dropped on the lifting up of the planter, and has time to fall into its place in the angular space during the passage of the planter from one hill to another, and from there must be expelled, however quickly may be the depressing and lifting of the plunger B.

What I claim as my invention, and desire to secure by Letters Patent, in a seed-planter hav- ing a wedge-shaped planting-receptacle whose hinged side is closed by the action of a spring, is—

Combining the plunger of said planter to any suitable portion of the seed-box by means of a spring of sufficient stiffness to prevent said plunger, in operating the planter, from sliding downward on the seed-box and opening the planting-receptacle before said receptacle has penetrated to the desired depth into the ground to deposit the seeds contained in it, substantially as herein set forth.

ANCIL STICKNEY.

Witnesses:
   L. D. STEVENS,
   W. H. BUNTIN.